US012417411B2

(12) United States Patent
Sharma Mittal et al.

(10) Patent No.: US 12,417,411 B2
(45) Date of Patent: Sep. 16, 2025

(54) AUTOMATICALLY DETECTING OUTLIERS IN FEDERATED DATA

(71) Applicant: International Business Machines Corporation, Armonk, NY (US)

(72) Inventors: Ruhi Sharma Mittal, Bengaluru (IN); Lokesh Nagalapatti, Bangalore (IN); Ramasuri Narayanam, Bangalore (IN); Sambaran Bandyopadhyay, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 17/391,554

(22) Filed: Aug. 2, 2021

(65) Prior Publication Data

US 2023/0032912 A1 Feb. 2, 2023

(51) Int. Cl.
G06N 20/20 (2019.01)
G06F 18/21 (2023.01)
G06F 18/214 (2023.01)
G06N 3/02 (2006.01)

(52) U.S. Cl.
CPC ........... *G06N 20/20* (2019.01); *G06F 18/214* (2023.01); *G06F 18/2185* (2023.01); *G06N 3/02* (2013.01)

(58) Field of Classification Search
CPC .................................................... G06N 20/20
USPC ............................................................ 706/12
See application file for complete search history.

(56) References Cited

U.S. PATENT DOCUMENTS

| 2005/0071436 | A1* | 3/2005 | Hsu ....................... G06F 11/008 709/212 |
| 2020/0034665 | A1* | 1/2020 | Ghanta .................... G06F 17/18 |
| 2020/0151550 | A1* | 5/2020 | Garbin ............... G11C 13/0069 |
| 2020/0258004 | A1* | 8/2020 | Heimann ............ H04L 63/1433 |
| 2020/0319877 | A1* | 10/2020 | Glazer ..................... G06N 5/04 |
| 2023/0351249 | A1* | 11/2023 | Livny .................... G06N 3/047 |

FOREIGN PATENT DOCUMENTS

| IN | 201941032612 A | 9/2019 |
| WO | 2020229684 A1 | 11/2020 |

OTHER PUBLICATIONS

Thien Duc Nguyen, et al. DÏoT: A Federated Self-learning Anomaly Detection System for IoT, Published Date: May 10, 2019.

(Continued)

*Primary Examiner* — Austin Hicks
(74) *Attorney, Agent, or Firm* — Ryan, Mason & Lewis, LLP

(57) ABSTRACT

Methods, systems, and computer program products for automatically detecting outliers in federated data are provided herein. A computer-implemented method includes obtaining local outlier-related data from multiple client systems within a federated learning environment; detecting one or more federated learning environment-level outliers from at least a portion of the multiple client systems by processing at least a portion of the obtained local outlier-related data using one or more artificial intelligence models; determining at least one calibration parameter for detecting federated learning environment-level outliers based at least in part on the one or more detected federated learning environment-level outliers; and outputting the at least one determined calibration parameter to at least a portion of the multiple client systems within the federated learning environment.

20 Claims, 6 Drawing Sheets

(56) References Cited

OTHER PUBLICATIONS

Tao Yu, et al. Salvaging Federated Learning by Local Adaptation, Published Date: Feb. 12, 2020.
Kapil Chandorikar, Introduction to Federated Learning and Privacy Preservation, https://towardsdatascience.com/Introduction-to-federated-learning-and-privacy-preservation-75644686b559, Jul. 19, 2019.
Avishek Ghosh, et al. Robust Federated Learning in a Heterogeneous Environment, https://arxiv.org/abs/1906.06629, Oct. 9, 2019.
Sambaran Bandyopadhyay et al. Outlier aware Network Embedding, https://www.aaai.org/ojs/index.php/AAAI/article/download/3763/3641, 2019.
Davy Preuveneers et al. Chained Anomaly Detection Models for Federated Learning: An Intrusion Detection Case Study, https://www.researchgate.net/publication/329758083_Chained_Anomaly_Detection_Models_for_Federated_Learning_An_Intrusion_Detection_Case_Study, Dec. 18, 2018.
Tiffany Tuor, et al. Overcoming Noisy and Irrelevant Data in Federated Learning, Jun. 23, 2020.
Chulin Xie, et al. DBA: Distributed Backdoor Attacks Against Federated Learning, https://openreview.net/forum?id=rkgyS0VFvr, 2020.
Ito et al., An On-Device Federated Learning Approach for Cooperative Anomaly Detection, Published Date: Feb. 2020.
Bandyopadhyay et al., Outlier Resistant Unsupervised Deep Architectures for Attributed Network Embedding, WSDM 20, Feb. 3-7, 2020.

\* cited by examiner

AUTOMATICALLY DETECTING OUTLIERS IN FEDERATED DATA

BACKGROUND

The present application generally relates to information technology and, more particularly, to federated learning techniques. More specifically, if data associated with an asset (e.g., a file) resides in more than one cloud (e.g., private and/or public clouds), then such data are commonly referred to as hybrid data. Hybrid data analytics are implemented, for example, when work is being performed across platforms. However, issues such as compliance, security, data privacy, network performance, etc. often make hybrid data difficult for enterprises or other organizations to move together (or pool) across different cloud environments. As such, many conventional artificial intelligence models are inadequate for hybrid data analytics because such models typically assume that all of the data is available at one central location.

In response to such problems, federated learning paradigms can be utilized, which do not require data pooling. However, in training models in connection with federated learning frameworks, challenges exist with respect to identifying outliers from individual client and/or user data without violating data privacy constraints required in the federated learning frameworks.

SUMMARY

In one embodiment of the present invention, techniques for automatically detecting outliers in federated data are provided. An exemplary computer-implemented method can include obtaining local outlier-related data from multiple client systems within a federated learning environment, and detecting one or more federated learning environment-level outliers from at least a portion of the multiple client systems by processing at least a portion of the obtained local outlier-related data using one or more artificial intelligence models. The method also includes determining at least one calibration parameter for detecting federated learning environment-level outliers based at least in part on the one or more detected federated learning environment-level outliers, and outputting the at least one determined calibration parameter to at least a portion of the multiple client systems within the federated learning environment.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
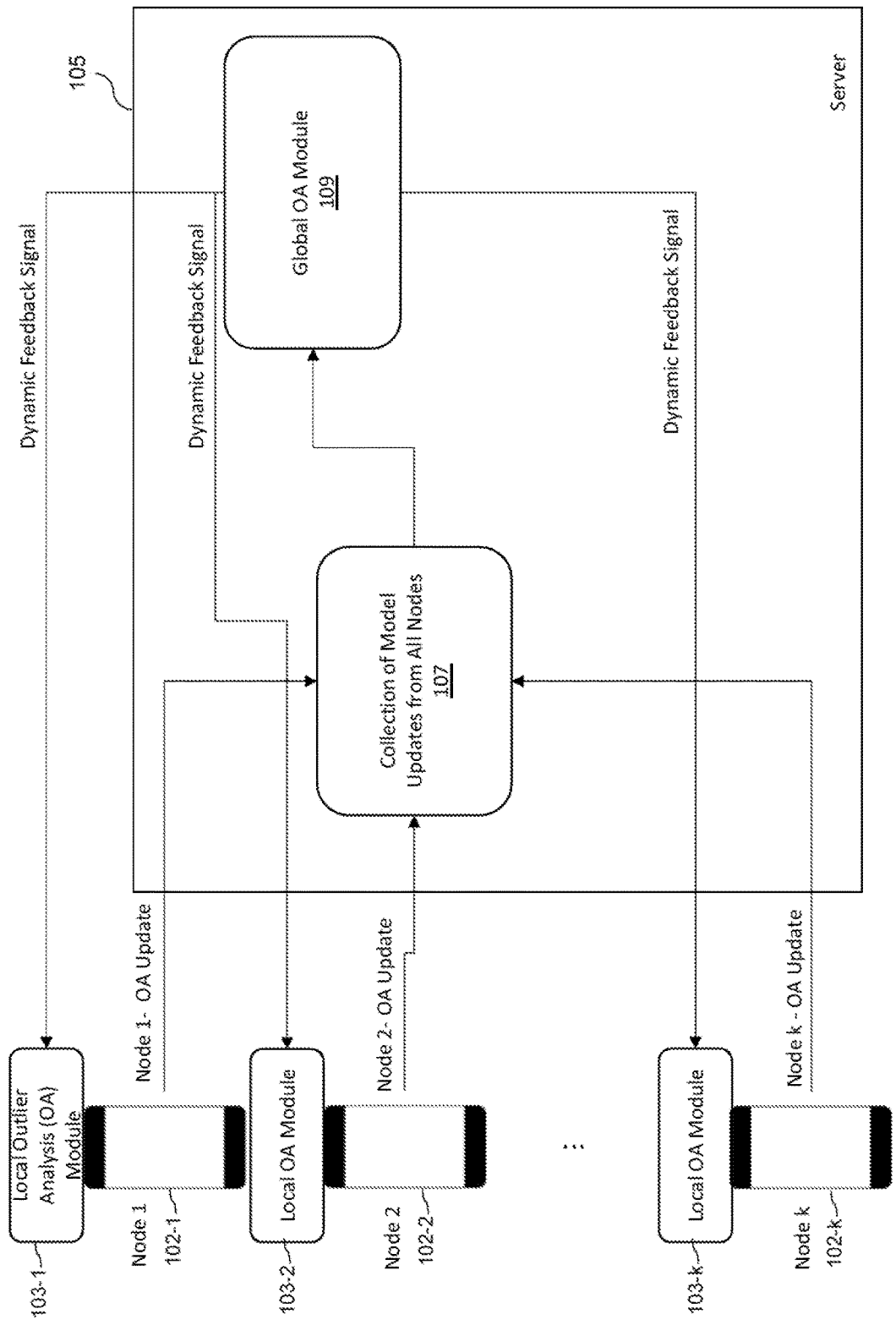
FIG. 1 is a diagram illustrating system architecture, according to an example embodiment of the invention.

As described herein, an embodiment of the present invention includes an outlier-aware federated learning system and dynamic method to determine globally-consistent outliers from individual clients' private data. Such an embodiment includes learning one or more data signatures for normal data points and one or more data signatures for outlier data points corresponding to data residing at one or more client locations. The data signatures can be shared with at least one server, where such a server determines if a local outlier signal matches at least one data signature from at least one different client, or if the local outlier signal does not match with any data signatures and hence is a genuine (global) outlier.

At least one embodiment includes determining globally-consistent outliers from individual clients' local data in a privacy-preserving manner by dynamically updating outlierness scores of local clients' data. By way of illustration, in a typical dataset, there can exist certain data points that exhibit behavior that is abnormal with respect to other data points in the dataset. Such data points (or artifacts) are considered outliers with respect to other data points in the dataset. While some abnormalities can be directly observable in the dataset, there can be other latent factors that can also contribute to abnormalities, which are generally referred to herein as outlierness.

Accordingly, at least one embodiment includes detecting outliers from individual clients' local data in an adaptive manner by adjusting local and global notions of outliers. By way of illustration, a data point may exhibit outlierness with respect to other data points associated with the same client. This notion is referred to herein as local outlierness. On the other hand, there can be a set of data points that appear normal at a client-level but can exhibit outlierness when aggregated with data associated with other clients. This notion is referred to herein as global outlierness. As further detailed herein, one or more embodiments include defining and implementing measures to capture both notions.

Additionally or alternatively, such an embodiment can include learning an objective function (e.g., a loss function) of a given model being at each individual client, wherein in connection with such learning, regular (i.e., non-outlier) data points make more contribution towards the objective (loss) function and outlier data points make less contribution towards the objective (loss) function. In at least one embodiment, such contribution weights are adjustable and learned.

As also detailed herein, one or more embodiments include dynamically updating the outlierness (i.e., the degree to which a data point is deemed an outlier relative to other data points) of one or more data points in synchrony with an evolution of a corresponding global model. In such an embodiment, by way of example, a server can learn the outlierness of each client and convey the same to the clients. The clients then recalibrate the outlierness measure they assign to their data points, and this recalibration leads to synchrony. Accordingly, such an embodiment can include allowing for model building and outlier handling in an integrated manner. In one or more embodiments, such a model can include one or more artificial intelligence and/or machine learning models (e.g., logistic regression models, deep neural networks, recurrent neural networks, etc.).

FIG. 1 is a diagram illustrating system architecture, according to an embodiment of the invention. By way of illustration, FIG. 1 depicts nodes 102-1, 102-2, . . . , 102-$k$ (collectively referred to herein as nodes 102) and server 105. As used herein, nodes and clients (or client devices or client systems) are used synonymously. As also depicted in FIG. 1, each node 102 includes a corresponding local outlier analysis (OA) module 103 (e.g., module 103 can be resident on/in node 102, linked to node 102, etc.), and the server 105 includes a collection 107 of model updates from nodes 102 and a global OA module 109.

More specifically, as illustrated in FIG. 1, each node 102 generates and provides to server 105 (particularly, to model update collection 107) one or more outlier analysis updates derived from its respective local outlier analysis (carried out by module 103). At least a portion of the updates contained within collection 107 are then provided to global OA module 109, wherein global outlier analysis is carried out (as further detailed herein). Based at least in part on such global outlier analysis, global OA module 109 generates and outputs, to the local OA module 103 of each node 102, one or more dynamic feedback signals. In one or more embodiments, the feedback signal sent by the server may include the outlierness measures (e.g., at least one real number) assigned to clients based at least in part on the updates shared by the clients. Such a client, upon receiving the signal, recalibrates its local outlierness measure.

Figure 2:
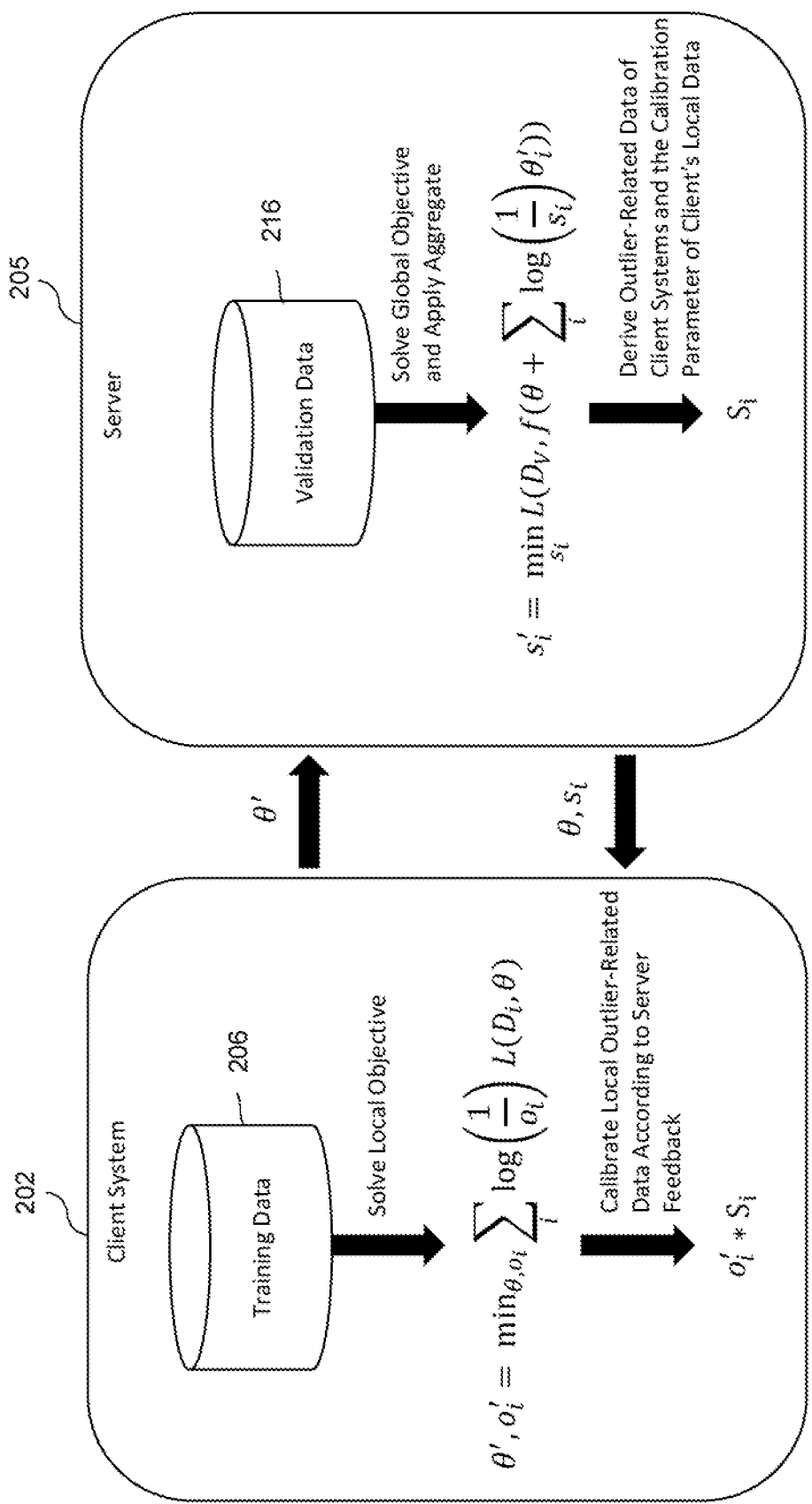
FIG. 2 is a diagram illustrating client actions and server actions, according to an example embodiment of the invention.

FIG. 2 is a diagram illustrating client actions and server actions, according to an example embodiment of the invention. By way of illustration, FIG. 2 depicts a client system 202 and a server 205. As depicted in FIG. 2, client system 202 includes a database 206 of training data (e.g., labelled data points, meant for a particular front-end task, that can potentially contain outliers, noise, etc.), and server 205 includes a database 216 of validation data (e.g., labelled data points, meant for the particular front-end task, that do not contain outliers, noise, etc.). As further detailed below and herein, client system 202 uses at least a portion of the training data contained within database 206 to solve at least one local objective $$(\text{e.g.,}\ \theta', o'_i = \min_{\theta, o_i} \sum_i \log\left(\frac{1}{o_i}\right) L(D_i, \theta)).$$

At least a portion of such a solution is output to server 205, which uses such an output in conjunction with at least a portion of the validation data contained within database 216 to solve at least one global objective and apply at least one aggregate. By way of illustration, in one or more embodiments, a server aggregates the information received from all clients and applies the aggregated information to the global model.

As also depicted in FIG. 2, based at least in part on the solution to the at least one global objective, server 205 can derive values pertaining to the outlierness of one or more client systems (such as, for example, client system 202) as well as at least one calibration parameter of the client system's local data. Server 205 then outputs the calibration parameter to client system 202 (and/or other client systems), and client system 202 uses the calibration parameter as well as at least a portion of the local objective solution to calibrate local outlierness. In one or more embodiments, the clients downscale or upscale the outlierness measures they assign to their local data points based at least in part on the feedback signal (related to global outlierness) sent by the server.

In at least one embodiment, local outlier analysis can include a client objective being modelled as:

$$\theta', o'_i = \min_{\theta, o_i} \sum_i \log\left(\frac{1}{o_i}\right) L(D_i, \theta),$$

such that $\Sigma_i\ o_i = s_i$ and $o_i > 0$. As used above and herein, $o_i$ refers to the parameters of the model, $D_i$ refers to the $i^{th}$ data point owned by the client, and $o_i$ refers to the outlierness measure assigned by the client to its $i^{th}$ data point $D_i$. By way of example, assume that $s_i$ is a number $\epsilon(0,1)$, and the number is obtained as a feedback from the server. Additionally, one or more embodiments include using at least one coordinate gradient descent algorithm to solve the above optimization problem. In connection with a coordinate descent algorithm, at least one embodiment includes learning $\theta$, $o_i$ iteratively. In particular, such an embodiment can include learning $\theta$ using gradient descent approaches and learning $o_i$ using closed form update rules. Assuming that $o_i$ is fixed, such an embodiment can include obtaining $\theta'$ using successive stochastic gradient descent (SGD) steps. In connection with SGD, at least one embodiment can include deriving the gradients of the objective with respect to $\theta$ and applying the gradients to the model in an iterative fashion, successively. Once $\theta'$ is obtained, $o'_i$ can be determined using closed form update rules as further detailed below.

By way of example, with respect to a closed form update rule for $o_i$, assume that given $\theta'$, the gradient for $o_i$ can be computed. Because it is a constrained optimization, at least one embodiment includes using a Lagrangian function for an equality constraint, wherein the Lagrangian parameter can be represented as $\lambda$, as follows:

$$\Delta o_i = -\frac{1}{o_i} L(D_i, \theta') + \lambda.$$

By first order optimality conditions, $\Delta o_i = 0$ at the optimum. Accordingly, such an embodiment can utilize the following:

$$\lambda = \frac{1}{o_i} L(D_i, \theta'),$$

wherein $$o_i = \frac{L(D_i, \theta')}{\lambda}.$$

Because $$\sum_k o_i = s_i, \sum_k \frac{L(D_i, \theta')}{\lambda} = s_i, \text{ and } \lambda = \frac{\Sigma_i L(D_i, \theta^i)}{s_i}.$$

Therefore, in such an embodiment, the closed form update rule for $$o'_i = \frac{L(D_i, \theta')}{\Sigma_i L(D_i, \theta')} * s_i.$$

As used above and herein, $s_i$ refers to the feedback signal sent by the server to $i^{th}$ client, and the above equation, wherein $s_i$ is being multiplied, is referred to as a recalibration step.

Also, in connection with local outlier analysis, $o_i$ can be interpreted as an outlier score for the data point i. If $o_i$ is higher, $$\log\left(\frac{1}{o_i}\right)$$

is lesser, and hence me contribution of the data point $D_i$ towards the loss function is less. More specifically, the $i^{th}$ data point $D_i$ contributes less and/or lesser information to the model as compared to other data points possessed by the clients. Accordingly, the contribution of data point $D_i$ towards the gradient θ' is lesser, and as such, there is lesser contribution from the outliers towards the local update computation. In one or more embodiments, when clients share updates θ' with the server, the server aggregates the updates and applies the aggregated data to the model.

As detailed herein, at least one embodiment includes incorporating a global outlier analysis. In such an embodiment, once the server aggregates and/or pools updates from the clients {θ'$_1$, θ'$_2$, . . . , θ'$_n$}, the server performs a global outlier analysis and determines which updates are problematic (e.g., updates derived from outlier data points). Additionally, in connection with aggregating the updates, the server discounts the contribution of the problematic updates. Accordingly, in one or more embodiments, the aggregation strategy can be modeled and thereby solved as an optimization problem. By way of example, assume that the server derives the aggregate as $$\theta_{agg} = \Sigma_i \log\left(\frac{1}{s_i}\right) \theta'_i$$

such that $\Sigma_i s_i = 1$, and the server applies the aggregate as $\theta = \theta + \theta_{agg}$. In at least one embodiment, the $s_i$ is learned by the algorithm (e.g., closed form update rules derived from first order optimality conditions). Additionally, the server sends $s_i$ as feedback to the client(s).

Accordingly, in such an embodiment, an objective of the server can be implemented as follows:

$$s'_i = \min_{s_i} L(D_V, f(\theta + \sum_k \log\left(\frac{1}{s_i}\right)\theta'_i))$$

such that $\Sigma_i s_i = 1$, wherein f(•) represents the functional form of the central model. Note that the updates are derived from the respective local datasets from the clients and the above optimization objective involves the computation of loss on a disjoint dataset $D_V$. Also, as further described herein, at least one embodiment includes deriving closed form update rules to obtain $s'_i$.

In such an embodiment, solving for $s'_i$ can include the following: let $$\theta_{temp} = \theta + \Sigma_i \log\left(\frac{1}{s_i}\right)\theta'_i,$$

and let λ be the Lagrangian parameter for the equality constraint. Using a chain rule, $$\Delta s_i = \Delta L(D_V, f(\theta_{temp})) * \Delta f(\theta_{temp}) * \Delta_{s_i} \theta_{temp} + \lambda,$$

$$\text{and} = \Delta L(D_V, f(\theta_{temp})) * \Delta f(\theta_{temp}) * -\frac{1}{s_i}\theta'_i + \lambda.$$

Additionally, using a first order optimality condition, one or more embodiments can include implementing the following:

$$\lambda = \Delta L(D_V, f(\theta_{temp})) * \Delta f(\theta_{temp}) * \frac{1}{s_i}\theta'_i;$$

$$\text{as well as } s_i = \frac{1}{\lambda} * \Delta L(D_V, f(\theta_{temp})) * \Delta f(\theta_{temp}) * \theta'_i.$$

As used above and herein, temp refers to and/or represents parameters with which gradients are derived. Also, because $$\Sigma_i s_i = 1, \Sigma_i \frac{1}{\lambda} * \Delta L(D_V, f(\theta_{temp})) * \Delta f(\theta_{temp}) * \theta'_i = 1,$$

$$\text{or, } \lambda = \sum_k \Delta L(D_V, f(\theta_{temp})) * \Delta f(\theta_{temp}) * \theta'_i.$$

Therefore, in at least one embodiment, $$s_i = \frac{\Delta L(D_V, f(\theta_{temp})) * \Delta f(\theta_{temp}) * \theta'_i}{\Sigma_i \Delta L(D_V, f(\theta_{temp})) * \Delta f(\theta_{temp}) * \theta'_i}.$$

As such, in connection with computing the above closed form expression, the server can subsequently send the $s_i$ to each client, wherein $s_i$ acts, for example, as the calibration parameter which each client should implement and/or adjust locally. Further, in one or more embodiments, the server computes the aggregate as $$\theta_{agg} = \Sigma_i \log\left(\frac{1}{s_i}\right)\theta'_i.$$

As used above and herein, $\theta_{agg}$ refers to and/or represents the parameters of the global model, and is obtained by aggregating the information shared by all of the clients.

Additionally or alternatively, at least one embodiment includes deriving outlier scores from one or more neural networks. By way merely of example, consider a system wherein there are two types of outliers: data outliers within a client device or system (i.e., local outlier analysis); and client outliers among the larger network or system (i.e., global outlier analysis). In such an example embodiment, the number of trainable outlier parameters can be equal to the sum of the total number of data points to clients and the number of clients. Accordingly, one or more embodiments can include implementing an outlier score as a function of embeddings, instead of, for example, independent parameters to learn. By way or illustration, in such an embodiment, for the $i^{th}$ data in the $j^{th}$ client, $o_i = MLP(D_i) \forall o_i$. Also, in such an embodiment, for the $i^{th}$ client, $s_i = MLP(\theta_i) \forall s_i$, and the number of parameters of the multilayer perceptrons (MLPs) is fixed (i.e., the number does not grow with the number of clients and/or data points). Additionally or alternatively, outlierness can also be captured from embeddings, given sufficient capacity of the MLPs. Such a formulation can be utilized, for example, in an inductive setting because, for example, the trained MLP can predict at least one outlierness measure given an arbitrary data point, and as such, one or more embodiments can also include predicting outlierness of data points that are not present in the training data.

Figure 3:
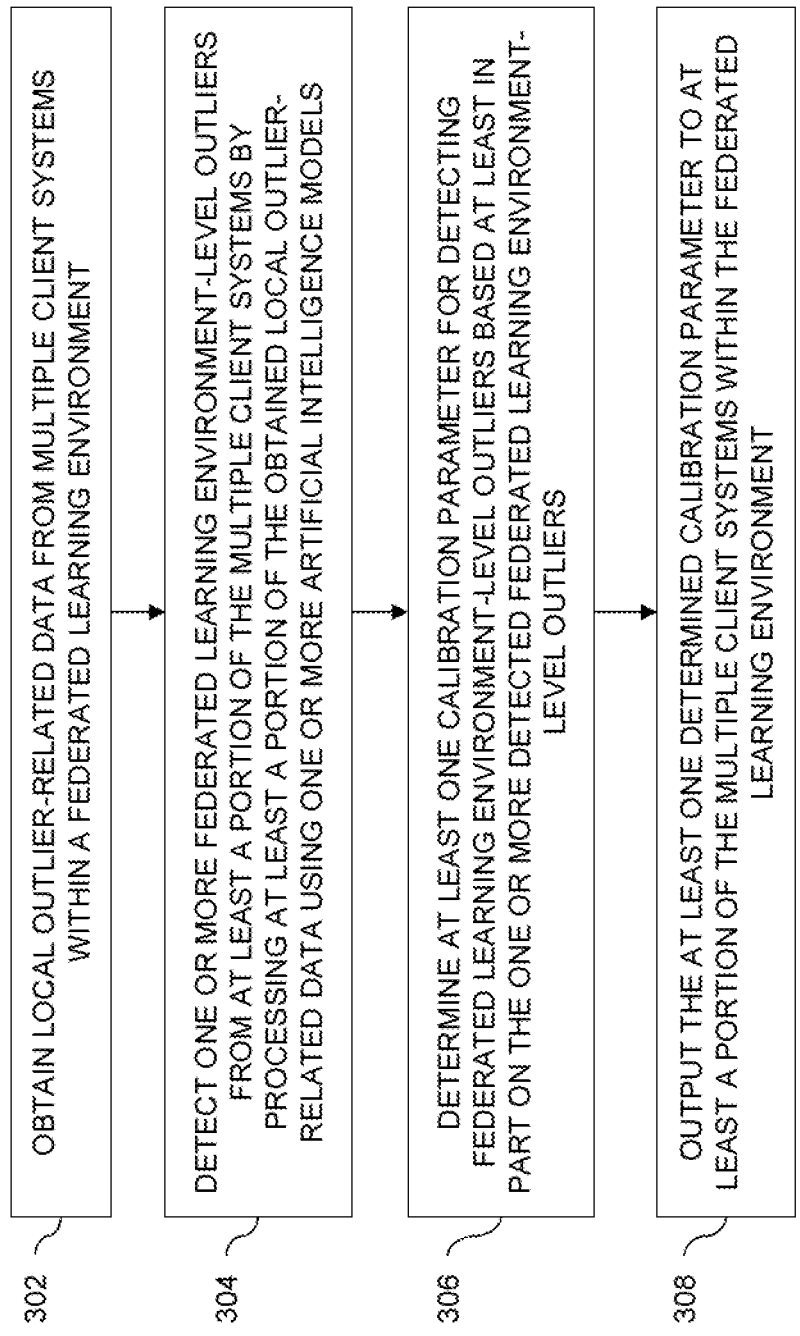
FIG. 3 is a flow diagram illustrating techniques according to an embodiment of the invention.

FIG. 3 is a flow diagram illustrating techniques according to an embodiment of the present invention. Step 302 includes obtaining local outlier-related data from multiple client systems within a federated learning environment. In one or more embodiments, the local outlier-related data include data pertaining to solutions to one or more local loss functions determined by the multiple client systems.

Step 304 includes detecting one or more federated learning environment-level outliers from at least a portion of the multiple client systems by processing at least a portion of the obtained local outlier-related data using one or more artificial intelligence models. In at least one embodiment, processing at least a portion of the obtained local outlier-related data using one or more artificial intelligence models includes processing at least a portion of the obtained local outlier-related data using one or more neural networks. In such an embodiment, using the one or more neural networks includes training a number of multiple outlier parameters equal to a sum of a total number of data points to client systems and a total number of client systems. Further, in at least one embodiment, using the one or more artificial intelligence models can include implementing one or more multilayer perceptrons.

Additionally or alternatively, detecting the one or more federated learning environment-level outliers can include generating an outlier score to each of one or more portions of the obtained local outlier-related data. In one or more embodiments, generating the outlier score includes generating the outlier score as a function of one or more embeddings of one or more neural networks.

Step 306 includes determining at least one calibration parameter for detecting federated learning environment-level outliers based at least in part on the one or more detected federated learning environment-level outliers. In at least one embodiment, determining at least one calibration parameter includes solving one or more federated learning environment-level loss functions.

Step 308 includes outputting the at least one determined calibration parameter to at least a portion of the multiple client systems within the federated learning environment. In one or more embodiments, outputting the at least one determined calibration parameter includes outputting, synchronously, the at least one determined calibration parameter to each of the multiple client systems within the federated learning environment.

The techniques depicted in FIG. 3 can also include automatically updating the one or more artificial intelligence models using feedback based on at least one of the one or more detected federated learning environment-level outliers and the at least one determined calibration parameter. Also, in at least one embodiment, software implementing the techniques depicted in FIG. 3 can be provided as a service in a cloud environment.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
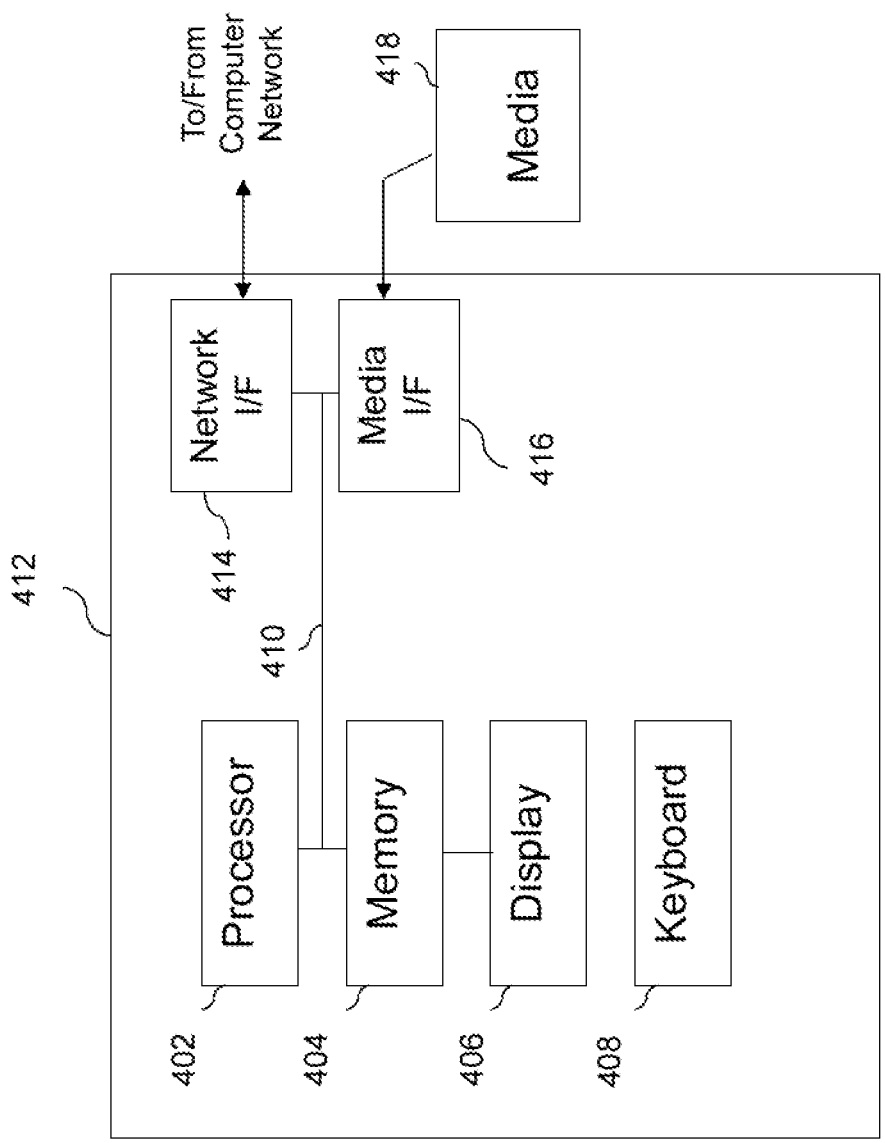
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
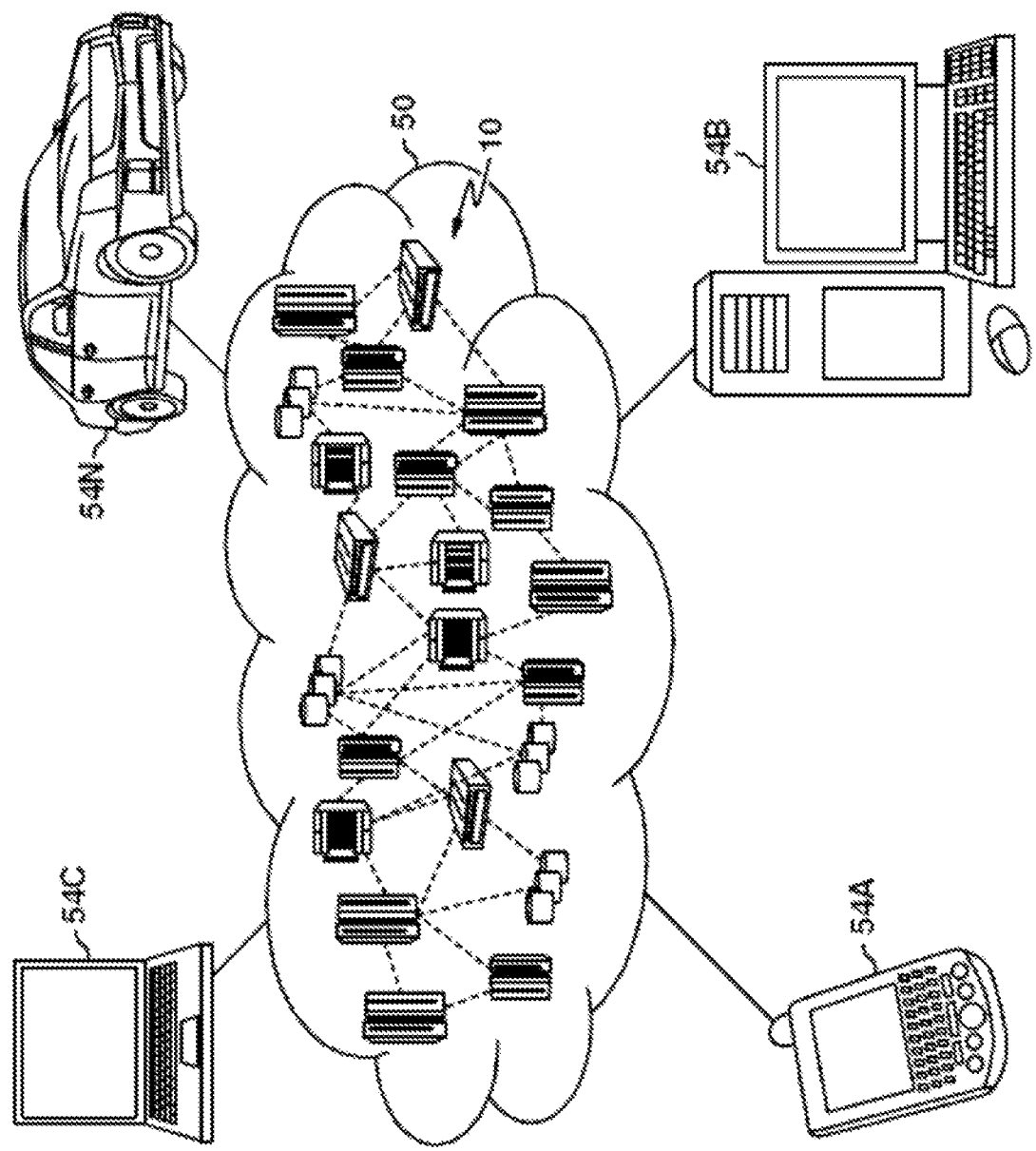
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
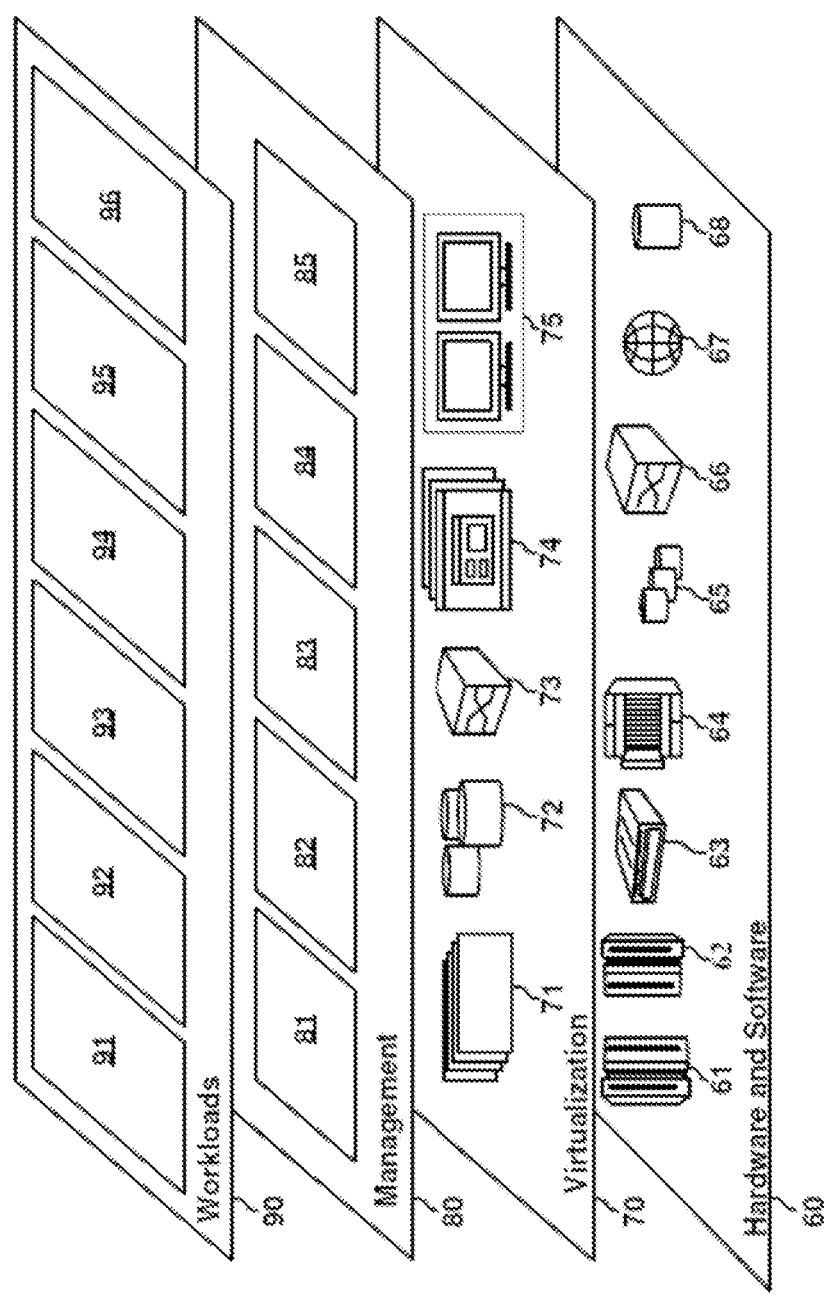
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and federated data outlier detection 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, determining globally-consistent outliers from individual clients' local data in a privacy-preserving manner.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining local outlier-related data from multiple client systems within a federated learning environment;
   detecting one or more federated learning environment-level outliers from at least a portion of the multiple client systems by processing at least a portion of the obtained local outlier-related data using one or more artificial intelligence models, wherein processing at least a portion of the obtained local outlier-related data using one or more artificial intelligence models comprises processing the at least a portion of the obtained local outlier-related data using one or more neural networks trained using a number of multiple outlier parameters equal to a sum of a total number of data points in the local outlier-related data and a total number of client systems in the multiple client systems within the federated learning environment;

determining at least one calibration parameter for detecting federated learning environment-level outliers based at least in part on the one or more detected federated learning environment-level outliers; and outputting the at least one determined calibration parameter to at least a portion of the multiple client systems within the federated learning environment, wherein outputting the at least one determined calibration parameter comprises outputting, using at least one router device, respective client system-specific signals related to the at least one determined calibration parameter to the multiple client systems;

wherein the method is carried out by at least one computing device.

2. The computer-implemented method of claim 1, wherein detecting the one or more federated learning environment-level outliers comprises generating an outlier score to each of one or more portions of the obtained local outlier-related data.

3. The computer-implemented method of claim 2, wherein generating the outlier score comprises generating the outlier score as a function of one or more embeddings of the one or more neural networks.

4. The computer-implemented method of claim 1, wherein using the one or more artificial intelligence models comprises implementing one or more multilayer perceptrons.

5. The computer-implemented method of claim 1, wherein outputting the at least one determined calibration parameter comprises outputting, synchronously, the at least one determined calibration parameter to each of the multiple client systems within the federated learning environment.

6. The computer-implemented method of claim 1, wherein determining at least one calibration parameter comprises solving one or more federated learning environment-level loss functions.

7. The computer-implemented method of claim 1, further comprising:

automatically updating the one or more artificial intelligence models using feedback based on at least one of the one or more detected federated learning environment-level outliers and the at least one determined calibration parameter.

8. The computer-implemented method of claim 1, wherein the local outlier-related data comprise data pertaining to solutions to one or more local loss functions determined by the multiple client systems.

9. The computer-implemented method of claim 1, wherein software implementing the method is provided as a service in a cloud environment.

10. A computer program product comprising a computer readable storage medium having program instructions embodied therewith, the program instructions executable by a computing device to cause the computing device to:

obtain local outlier-related data from multiple client systems within a federated learning environment;

detect one or more federated learning environment-level outliers from at least a portion of the multiple client systems by processing at least a portion of the obtained local outlier-related data using one or more artificial intelligence models, wherein processing at least a portion of the obtained local outlier-related data using one or more artificial intelligence models comprises processing the at least a portion of the obtained local outlier-related data using one or more neural networks trained using a number of multiple outlier parameters equal to a sum of a total number of data points in the local outlier-related data and a total number of client systems in the multiple client systems within the federated learning environment;

determine at least one calibration parameter for detecting federated learning environment-level outliers based at least in part on the one or more detected federated learning environment-level outliers; and output the at least one determined calibration parameter to at least a portion of the multiple client systems within the federated learning environment, wherein outputting the at least one determined calibration parameter comprises outputting, using at least one router device, respective client system-specific signals related to the at least one determined calibration parameter to the multiple client systems.

11. The computer program product of claim 10, wherein detecting the one or more federated learning environment-level outliers comprises generating an outlier score to each of one or more portions of the obtained local outlier-related data.

12. The computer program product of claim 11, wherein generating the outlier score comprises generating the outlier score as a function of one or more embeddings of the one or more neural networks.

13. The computer program product of claim 10, wherein using the one or more artificial intelligence models comprises implementing one or more multilayer perceptrons.

14. The computer program product of claim 10, wherein outputting the at least one determined calibration parameter comprises outputting, synchronously, the at least one determined calibration parameter to each of the multiple client systems within the federated learning environment.

15. The computer program product of claim 10, wherein determining at least one calibration parameter comprises solving one or more federated learning environment-level loss functions.

16. A system comprising:

a memory configured to store program instructions; and a processor operatively coupled to the memory to execute the program instructions to:

obtain local outlier-related data from multiple client systems within a federated learning environment;

detect one or more federated learning environment-level outliers from at least a portion of the multiple client systems by processing at least a portion of the obtained local outlier-related data using one or more artificial intelligence models, wherein processing at least a portion of the obtained local outlier-related data using one or more artificial intelligence models comprises processing the at least a portion of the obtained local outlier-related data using one or more neural networks trained using a number of multiple outlier parameters equal to a sum of a total number of data points in the local outlier-related data and a total number of client systems in the multiple client systems within the federated learning environment;

determine at least one calibration parameter for detecting federated learning environment-level outliers based at least in part on the one or more detected federated learning environment-level outliers; and output the at least one determined calibration parameter to at least a portion of the multiple client systems within the federated learning environment, wherein outputting the at least one determined calibration parameter comprises outputting, using at least one router device, respective client system-specific signals related to the at least one determined calibration parameter to the multiple client systems.

17. The system of claim 16, wherein detecting the one or more federated learning environment-level outliers comprises generating an outlier score to each of one or more portions of the obtained local outlier-related data.

18. The system of claim 17, wherein generating the outlier score comprises generating the outlier score as a function of one or more embeddings of the one or more neural networks.

19. The system of claim 16, wherein outputting the at least one determined calibration parameter comprises outputting, synchronously, the at least one determined calibration parameter to each of the multiple client systems within the federated learning environment.

20. The system of claim 16, wherein determining at least one calibration parameter comprises solving one or more federated learning environment-level loss functions.

\* \* \* \* \*